US009407989B1

(12) United States Patent
Woodrow et al.

(10) Patent No.: US 9,407,989 B1
(45) Date of Patent: Aug. 2, 2016

(54) CLOSED AUDIO CIRCUIT

(71) Applicants: Arthur Woodrow, Rancho Santa Fe, CA (US); Tyson McDowell, San Diego, CA (US)

(72) Inventors: Arthur Woodrow, Rancho Santa Fe, CA (US); Tyson McDowell, San Diego, CA (US)

( * ) Notice: Subject to any disclaimer, the term of this patent is extended or adjusted under 35 U.S.C. 154(b) by 0 days.

(21) Appl. No.: 14/755,005

(22) Filed: Jun. 30, 2015

(51) Int. Cl.

| | |
|---|---|
| ***H04B 1/00*** | (2006.01) |
| ***H04R 29/00*** | (2006.01) |
| ***H04R 3/00*** | (2006.01) |
| *H04R 27/00* | (2006.01) |
| *H04R 3/12* | (2006.01) |

(52) U.S. Cl.
CPC .. *H04R 3/00* (2013.01); *H04R 3/12* (2013.01); *H04R 27/00* (2013.01); *H04R 2420/03* (2013.01)

(58) Field of Classification Search
CPC ...... H04R 3/12; H04R 27/00; H04R 2420/03; H04R 3/00; H04R 3/005; H04R 29/00; H04R 29/007
USPC ......................... 381/119, 77, 56, 71.1–71.14, 381/94.1–94.9, 73.1, 80–83
See application file for complete search history.

(56) References Cited

U.S. PATENT DOCUMENTS

| | | | | |
|---|---|---|---|---|
| 5,533,131 | A * | 7/1996 | Kury | H04R 5/02 181/20 |
| 5,736,927 | A * | 4/1998 | Stebbins | G08B 29/26 340/3.32 |
| 5,796,789 | A | 8/1998 | Eftechiou | 379/35 |
| 6,064,743 | A | 5/2000 | Suggs | 381/104 |
| 7,190,799 | B2 * | 3/2007 | Bray | H04B 1/20 381/119 |
| 7,533,346 | B2 * | 5/2009 | McGrath | H04L 12/1822 715/757 |
| 8,369,534 | B2 | 2/2013 | Johnson et al. | 381/77 |
| 8,670,554 | B2 | 3/2014 | Mukund | 379/406.01 |
| 2015/0080052 | A1 | 3/2015 | Jensen | 455/557 |

* cited by examiner

*Primary Examiner* — Xu Mei
(74) *Attorney, Agent, or Firm* — Hayes Soloway P.C.

(57) ABSTRACT

A closed audio circuit is disclosed with function of eavesdropping prevention and audio clarity enhancement. The closed audio circuit includes a plurality of user equipment (UEs) and an audio signal combiner for a group audio communication session. The UEs and the audio signal combiner form a closed audio circuit allowing a user to target another user to create a private conversation to prevent eavesdropping. The UEs receive user audio input signals and send the audio input signals to the audio signal combiner. The audio signal combiner receives the audio input signals from each UE and transfer desired mixed audio output signals to each of the UE.

17 Claims, 2 Drawing Sheets

CLOSED AUDIO CIRCUIT

BACKGROUND OF THE INVENTION

1. Field of the Invention

The invention relates to a closed audio circuit for clarity enhancement and eavesdropping prevention, and to a method for its implementation the same.

2. Background of the Invention

Closed audio circuits have been used for a variety of audio communication applications, for purpose of audio signal enhancement, noise cancellation, etc. For example, noise control is an active or passive means of reducing sound emissions, often for personal comfort, environmental considerations or legal compliance. Active noise control is sound reduction using a power source. Passive noise control is sound reduction by noise-isolating materials such as insulation, sound-absorbing tiles, or a muffler rather than a power source.

Modern active noise control generally is achieved through the use of analog circuits or digital signal processing. Adaptive algorithms may be applied to analyze the waveform of background aural or nonaural noise, then based on a specific algorithm generate a signal that will either phase shift or invert the polarity of the original signal. This inverted signal (in antiphase) is then amplified and a transducer creates a sound wave directly proportional to the amplitude of the original waveform, creating destructive interference. This effectively reduces the volume of the perceivable noise.

Various efforts have been disclosed for eavesdropping prevention and/or audio clarity enhancement. For example, U.S. Pat. No. 5,796,789 discloses a telephone alerting device for connection to a telephone line and a telephone. When the telephone is off-hook, the device will generate a visual and an audio alarm if an additional telephone connected to the same line also goes off-hook. U.S. Pat. No. 8,369,534 discloses a switching noise cancellation method for microphone-speaker combinations used in two way audio communications. U.S. Pat. No. 6,064,743 discloses a wavetable audio synthesizer with waveform volume control for eliminating zipper noise. U.S. Pat. No. 8,670,554 discloses a method and apparatus for encoding multiple microphone signals into a source-separable audio signal for network transmission. U.S. Patent Application Publication No. 2015/0080052 discloses a method for eavesdropping prevention pairing a peripheral unit to a telephone via an interface unit.

However, none of the above prior art deals with situations when individuals in a group audio communication need to have private conversations without risking the eavesdropping of others as well as require enhanced clarity to prevent misunderstanding, no matter whether the conversations are conducted indoors or outdoors.

It would be desirable to have a closed audio circuit to prevent eavesdropping in combination with the capabilities of real-time sound source isolation for optimized audio clarity during a multiple-user audio communication session.

SUMMARY OF THE INVENTION

Embodiments of the invention relate to a closed audio circuit to prevent eavesdropping and enhance audio clarity for a multiple-user audio communication application.

In accordance with one embodiment of the present invention, a closed audio circuit is disclosed with function of eavesdropping prevention and audio clarity enhancement for a multiple-user audio communication application. The closed audio circuit includes a plurality of user equipment (UEs) and an audio signal combiner for a group audio communication session. The UEs and the audio signal combiner form a closed audio circuit allowing a user to target another user to create a private conversation to prevent eavesdropping. The UEs receive user audio input signals and send the audio input signals to the audio signal combiner. The audio signal combiner receives the audio input signals from each UE and transfers desired mixed audio output signals to each of the UEs. In some embodiments, the mixed output audio signal is an audio mixture signal of audio signals from each UE of the plurality of the UEs. In some embodiments, the mixed output audio signal sent to a corresponding UE is a mixture of audio signals from desired UEs from the plurality of UEs based on a selection input from the corresponding UE.

In one embodiment, the UEs include signal processing components for preliminary clarity enhancement before the user audio signals are transferred to the audio signal combiner. In one embodiment, the UEs transferred the user audio signals to the audio signal combiner directly without preliminary clarity enhancement. Alternatively, the audio signal combiner may do audio clarity enhancements solely or additionally for the user audio signals and then sends desired user audio signal mixture to corresponding UEs.

In another embodiment, the closed audio circuit may isolate an audio source from a particular UE in real time to modulate, augment or enhance the sound and volume specifically, and then mix with additional selected audio signals for an optimized and/or customized output audio signal for corresponding UE(s). The mixed output audio signal may include corresponding user's own audio input in raw or processed in the aforementioned ways to facilitate self-regulation of speech pattern, volume and tonality via local speaker-microphone feedback. Alternatively, the mixed output audio signal may exclude corresponding user's own audio input so that local speaker-microphone feedback will not occur.

In another embodiment, the closed audio circuit also may permit a user to target selected other users to create a "private conversation" or "sidebar conversation" where the private conversation audio signal is only distributed among the selected users and the eavesdropping by the users is prevented. Additionally, the user may still receive audio signals from other unselected users or mixed audio signals from the audio signal combiner.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments may be practiced in line with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different means, components, circuits, devices, and systems. Structures and devices shown in block diagram are illustrative of exemplary embodiments of the present invention. Connections between components within the figures are not intended to be limited to direct connections. Instead, connections between components may be modified, re-formatted via intermediary components. When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used for a closed audio circuit to prevent eavesdropping and enhance audio clarity for a multiple-user audio communication application. The closed audio circuit includes a plurality of user equipment (UEs) and an audio signal combiner for a group audio communication session. The UEs and the audio signal combiner form a closed audio circuit allowing a user to target another user to create a private conversation to prevent eavesdropping. The UEs receive user audio signals and transfer the audio signals to the audio signal combiner with or without preliminary clarity enhancement. The audio signal combiner receives the audio signals from each UE and transfer desired mixtures of audio signals to each of the UE.

Figure 1:
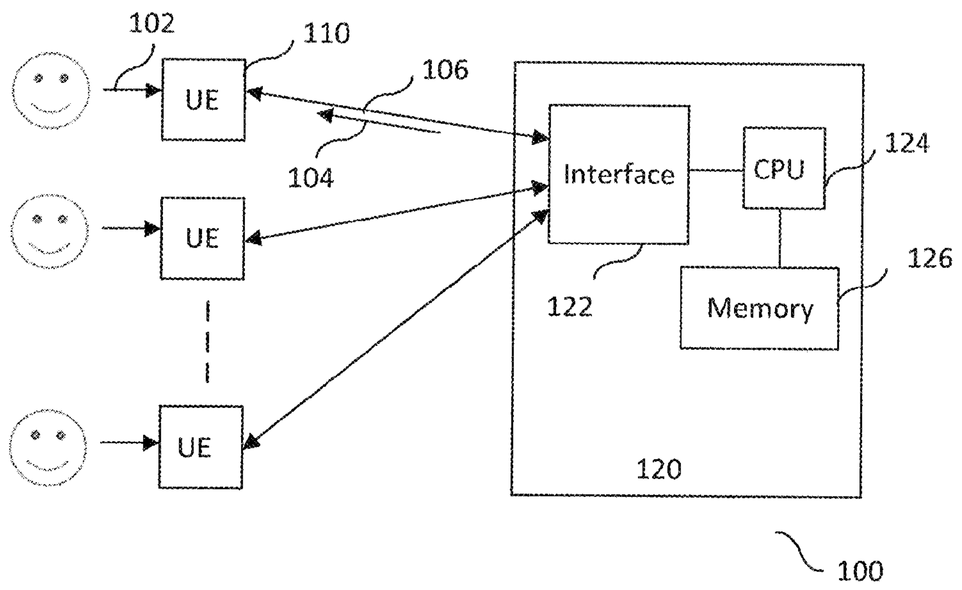
FIG. 1 is an exemplary block diagram of a closed audio circuit in accordance with an is embodiment of the present invention.

FIG. 1 is an exemplary block diagram of a closed audio circuit 100 in accordance with an embodiment of the present invention. The closed audio circuit 100 includes a plurality of user equipment (UEs) 110 and an audio signal combiner 120 for a group audio communication session. Each UE receives an audio input signal 102 from a corresponding user and sends the audio signal to the audio signal combiner 120. The audio signal combiner 120 receives the audio signals from each UE 110 and generates a mixed output audio signal 104 to each corresponding UE. The mixed output audio signal 104 to each corresponding UE may be the same or different for each of the plurality of UEs. In some embodiments, the mixed output audio signal 104 is an audio mixture signal of audio signals from each of the UE of the plurality of the UEs. In some embodiments, the mixed output audio signal 104 to a corresponding UE 110 is a mixture of audio signals from desired UEs from the plurality of UEs based on a selection input from the corresponding user.

The UE 110 may be a phone, smartphone, a tablet, a walkie-talkie, a wired or wireless headphone set. The audio signal combiner 120 couples to a UE 110 via a coupling path 106. The coupling path 106 may be a wired audio communication link, a wireless link or a combination thereof. The coupling path 106 for each corresponding UE may or may not the same. Some UEs may couple to the audio signal combiner 120 via wired link(s), while some other UEs may couple to the audio signal combiner 120 via wireless communication link(s).

The audio signal combiner 120 includes a communication interface 122, a processor 124 and a memory 126 (which, in certain embodiments, may be integrated within the processor 124). The processor 124 may be a microprocessor, a central processing unit (CPU), a digital signal processing (DSP) circuit, a programmable logic controller (PLC), a microcontroller, or a combination thereof. In some embodiment, the audio signal combiner 120 may be a sever in a local host setting or a web-based setting such as a cloud sever. In certain embodiments, some or all of the functionalities described herein as being performed by the audio signal combiner 120 may be provided by the processor 124 executing instructions stored on a non-transitory computer-readable medium, such as the memory 126, as shown in FIG. 1. The communication interface 122 may be an MIMO (multiple-input and multiple-output) communication interface capable of receiving audio inputs from the plurality of UEs and transmitting multiple audio outputs to the plurality of UEs.

Figure 2:
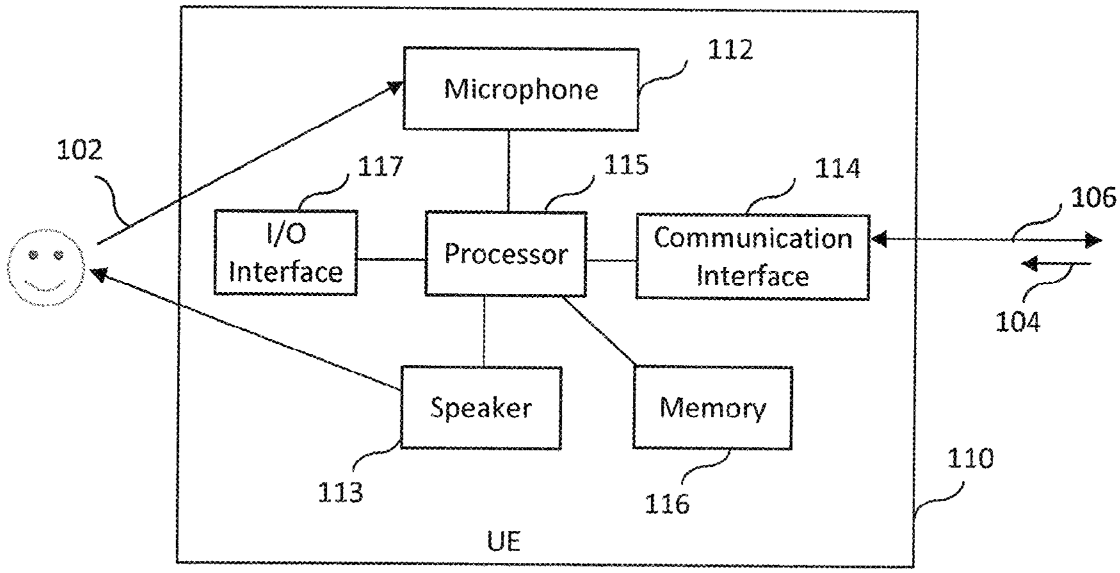
FIG. 2 is an exemplary block diagram of a user equipment (UE) circuit in accordance with an embodiment of the present invention.

FIG. 2 is an exemplary block diagram of a user equipment (UE) circuit in accordance with an embodiment of the present invention. As shown in FIG. 2, the UE 110 includes a microphone 112, a speaker 113, an UE communication interface 114, a processor 115, a memory 116 (which, in certain embodiments, may be integrated within the processor 115) and an input/output (I/O) interface 117. The input/output (I/O) interface 117 may include a keyboard, a touch screen, touch pad, or a combination thereof. In certain embodiments, the UE 110 may include additional components beyond those shown in FIG. 2 that may be responsible for enabling or performing the functions of the UE 110, such as communicating with another UE and for processing information for transmitting or from reception, including any of the functionality described herein. Such additional components are not shown in FIG. 2 but are intended to be within the scope of coverage of this application. In certain embodiments, the microphone 112 and the speaker 113 may be integrated within the UE 110, or as UE accessories coupled to the UE in a wired or wireless link.

After the UE 110 receives an audio input signal from a user, the processor 115 may implement a preliminary audio clarity enhancement for the audio input signal before the user input audio signal is sent to the audio signal combiner 120. The preliminary audio clarity enhancement may include passive or active noise cancellation, amplitude suppression for a certain audio frequency band, voice amplification/augmentation, etc. The preliminary clarity enhancement would be desirable especially when a user is in a noisy environment with unpleasant background noise. If the user is in a relative quite environment such as an indoor office, the UE 110 may send the audio input signal to the audio signal combiner 120 via the UE communication interface 114 without preliminary clarity enhancement. A user may decide whether the preliminary clarity enhancement is necessary for his/her voice input via the input/output (I/O) interface 117. After the UE 110 receives a mixed audio output signal from the audio signal combiner 120 via the UE communication interface 114, the user may also adjust the volume of the mixed audio output signal while the mixed audio output signal is played via the speaker 113.

In certain embodiments, some or all of the functionalities described herein as being performed by the UE may be provided by the processor 115 when the processor 115 executes instructions stored on a non-transitory computer-readable medium, such as the memory 116, as shown in FIG. 2.

Referring back to FIG. 1, the audio signal combiner 120 receives the audio input signals from each UE 110 and generates a mixed output audio signal 104 to each corresponding UE. The mixed output audio signal 104 to each corresponding UE may or may not be the same.

After receiving an audio input signal from each UE 110, the audio signal combiner 120 may perform an audio clarity check to verify whether the audio input signal from each UE 110 meets a clarity threshold. The clarity threshold may be related to at least one of signal-to-noise ratio (SNR), audio signal bandwidth, audio power, audio phase distortion, etc. If the audio input signal from a particular UE fails to meet the clarity threshold, the audio signal combiner 120 may isolate the audio input signal from the particular UE in real time and perform clarity enhancement for the audio input signal. The enhancement may include but not be limited to signal modulation or enhancement, noise depression, distortion repair, etc.

After performing clarity enhancement for those audio input signal(s) not meeting the clarity threshold, the audio signal combiner 120 combines multiple audio input signals into a unified output audio signals for an optimized and/or customized output audio signal for corresponding UEs. The mixed output audio signal may include corresponding user's own audio input in raw or processed in the aforementioned ways to facilitate self-regulation of speech pattern, volume and tonality via local speaker-microphone feedback. The inclusion of the user's own audio source in the user's own mixed audio output signal permits speaker self-modulation of voice characteristics therefore allowing each user to "self-regulate" to lower volumes and improved speech clarity (and pace) therefore further reducing the risk of eavesdropping from nearby non-paired listeners.

Alternatively, the mixed output audio signal may exclude corresponding user's own audio input so that local speaker-microphone feedback will not occur. The option of including/excluding a user's own audio input may be selected according to the user's input through the I/O interface 117 of the UE 110. The user's selection input is sent to the audio signal combiner 120, which then generate a corresponding mixture audio output signal to the specific UE including or excluding the user's own audio input.

Additionally, the user may see the plurality of users (or UEs) participating the audio communication session displayed via the I/O interface 117 and chooses a desired UE orUEs among the plurality of UEs, wherein only the audio input signals from the desired UE or UEs are included for the mixed audio output signal for the user. Equivalently, the user may choose to block certain users (or UEs) such that the user's corresponding mixture audio output signal exclude audio inputs from those certain users (or UEs).

In another embodiment, the closed audio circuit may also permits a user to target selected other users to create a "private conversation" or "sidebar conversation" where the audio signal of private conversation is only distributed among the desired users and the eavesdropping by the users is prevented. Simultaneously, the user may still receive audio signals from other unselected users or mixed audio signals from the audio signal combiner. In one embodiment, the any UE participated in the private conversation has a full list of participated UEs in the private conversation shown via the I/O interface 117 of each corresponding UE. In another embodiment, the list of participated UEs in the private conversation is not known to those UEs not in the private conversation. Such arrangement would further prevent the private conversation from being eavesdropped.

Any user being invited for the private conversation may decide whether to join the private conversation. The decision can be made via the I/O interface 117 of the user's corresponding UE. The audio signal combiner 120 distributes audio input signals related to the private conversation to the user being invited only after the user being invited sends an acceptance notice to the audio signal combiner 120. In some embodiments, any user already in the private conversation may decide to quite the private conversation via the I/O interface 117 of the user's corresponding UE. After receiving a quite notice from a user in the private conversation, the audio signal combiner 120 stops sending audio input signals related to the private conversation to the user choosing to quite.

In yet another embodiment, to initiate a private conversation, a user may need to send a private conversation request to selected other UEs via the audio signal combiner 120. The private conversation request may be an audio request, a private pairing request, or combination thereof. After the selected other UEs accept the private conversation request, the private conversation starts. In some embodiments, a user in the private conversation may select to include/exclude the user's own audio input within the private audio output signal sending to the user. The user may make the selection through the I/O interface 117 of the UE 110 and the selection input is sent to the audio signal combiner 120, which then process the corresponding mixed private audio output signal to the user accordingly.

Figure 3:
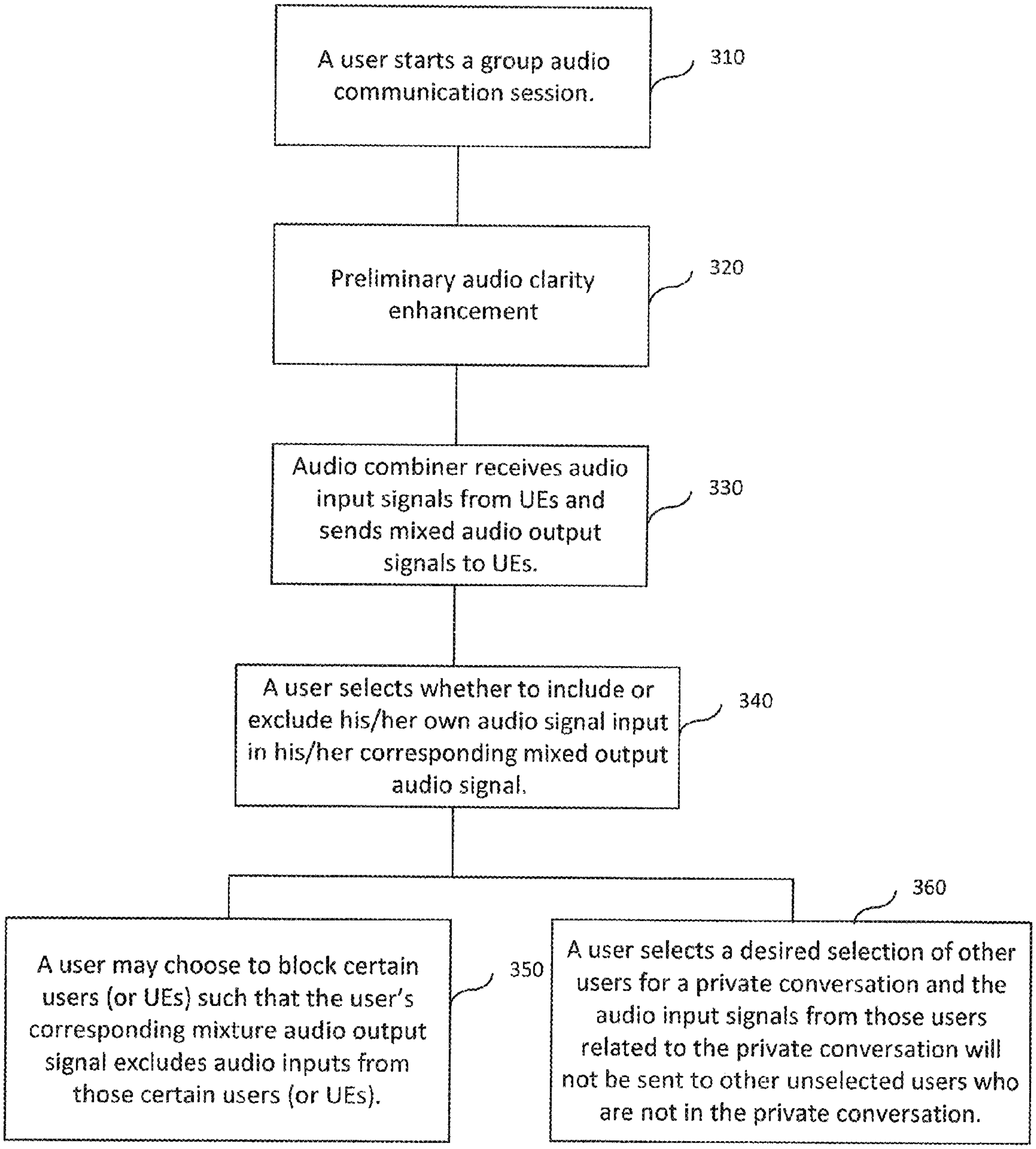
FIG. 3 is an exemplary flow diagram of a group audio communication session in accordance with an embodiment of the present invention.

FIG. 3 is an exemplary flow diagram of a group audio communication session in accordance with an embodiment of the present invention. In step 310, a user sends an invitation to a plurality of other users and initiates a group audio communication session. In step 320, the user decides whether a preliminary audio clarity enhancement is necessary. If necessary, the UE performs the preliminary audio clarity enhancement for the user's audio input signal. Step 320 may be applicable to all the UEs participating the group audio communication session. Alternatively, step 320 may be bypassed for UEs without the capacity of preliminary audio clarity enhancement.

In step 330, the audio signal combiner 120 receives the audio input signals from each UE 110 and generates a mixed output audio signal 104 to each corresponding UE. The mixed output audio signal 104 may or may not be the same for each corresponding UE. The audio signal combiner 120 also may perform an audio clarity check to verify whether the audio input signal from each UE meets a clarity threshold. If not, the audio signal combiner 120 may isolate the audio input signal from the particular UE in real time and perform clarity enhancement for the audio input signal before combining the audio input signal from the particular UE with any other audio input signals.

In step 340, a user selects whether to include or exclude his/her own audio signal input in his/her corresponding mixed output audio signal. In step 350, a user may choose to block certain users (or UEs) such that the user's corresponding mixture audio output signal excludes audio inputs from those certain users (or UEs).

In step 360, a user may in parallel selects a desired selection of other users for a private conversation and the audio input signals from those users related to the private conversation will not be sent to unselected other users who are not in the private conversation.

Although FIG. 3 is shown with the exemplary flow diagram for a group audio communication session, it is understood that various modification may be applied for the flow diagram. The modification may include excluding certain steps and/or adding additional steps, parallel steps, different step sequence arrangements, etc. For example, a user may request the private conversation in the middle of the group audio communication session before step 340. A user may even initiate or join another private conversation in parallel in the middle of the started private conversation.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A closed audio circuit for eavesdropping prevention and audio clarity enhancement, the closed audio circuit comprising:

a plurality of user equipment (UEs) with each UE receiving an audio input signal from each corresponding user; and an audio signal combiner receiving the audio input signals from the plurality of UEs and generating a desired mixed audio output signal for each UE of the plurality of UEs;

wherein the mixed audio output signal for each UE is generated based at least on a selection input from each corresponding user, and wherein after receiving the audio input signals from the plurality of UEs, the audio signal combiner performs an audio clarity check to verify whether the audio input signal from each UE meets a clarity threshold.

2. The closed audio circuit of claim 1 wherein the audio signal combiner includes a communication interface, a processor and a memory; wherein the communication interface couples to each UE of the plurality of UEs.

3. The closed audio circuit of claim 1 wherein the UEs are smartphones, tablets, walkie-talkies, headphone sets or a combination thereof.

4. The closed audio circuit of claim 1 wherein at least one UE of the plurality of UEs apply a preliminary audio clarity enhancement for the audio input signal.

5. The closed audio circuit of claim 4 wherein the preliminary audio clarity enhancement includes at least one of passive noise cancellation, active noise cancellation, amplitude suppression for selected frequency band and voice amplification.

6. The closed audio circuit of claim 1 wherein if a particular audio input signal from a particular UE of the plurality of UEs does not meet the clarity threshold, the audio signal combiner isolates the particular audio input signal in real time and performs clarity enhancement for the particular audio input signal.

7. The closed audio circuit of claim 1 wherein the selection input from each corresponding user include whether the corresponding user wants to include the corresponding user's own audio input to be included in the mixed audio output signal.

8. The closed audio circuit of claim 1 wherein the selection input from each corresponding user includes a list of desired UEs among the plurality of UEs, wherein only the audio input signals from the desired UEs are included for the mixed audio output signal for the corresponding user.

9. A method of group audio communication for eavesdropping prevention and audio clarity enhancement, the method comprising:

receiving a plurality of audio input signals from a plurality of users via a plurality of user equipment (UEs) with each user corresponding to a UE;

sending the plurality of audio input signals to an audio signal combiner; and generating by the audio signal combiner a desired mixed audio output signal for each UE of the plurality of UEs;

wherein the mixed audio output signal for each UE is generated based at least on a selection input from each corresponding user, and wherein the method further comprises performing at the audio signal combiner an audio clarity check to verify whether the audio input signal from each UE meets a clarity threshold after the audio signal combiner receives the audio input signals from the plurality of UEs.

10. The method of claim 9 wherein the UEs are smartphones, tablets, walkie-talkies, headphone sets or a combination thereof.

11. The method of claim 9 wherein the method further comprises applying a preliminary audio clarity enhancement for at least one audio input signal using a corresponding UE.

12. The method of claim 11 wherein the preliminary audio clarity enhancement includes at least one of passive noise cancellation, active noise cancellation, amplitude suppression for a selected frequency band and voice amplification.

13. The method of claim 9 wherein the method further comprises if a particular audio input signal from a particular UE does not meet the clarity threshold, the audio signal combiner isolates the particular audio input signal in real time and performs clarity enhancement for the particular audio input signal.

14. The method of claim 9 wherein the method further comprises starting a private conversation among a list of selected users from the plurality of users wherein the audio input signals from those selected users related to the private conversation are not sent to unselected users who are not in the private conversation.

15. The method of claim 14 wherein the list of selected users within the private conversation is not known to the unselected users who are not in the private conversation.

16. A non-transitory computer-readable medium for storing computer-executable instructions that are executed by a processor to perform operations comprising:

receiving a plurality of audio input signals from a plurality of user equipment (UEs);

receiving a plurality of selection inputs from each UE of the plurality of UEs;

generating a plurality of mixed audio output signals; and sending the plurality mixed audio output signals to the plurality of UEs;

wherein each mixed audio output signal related to a corresponding UE of the plurality of UEs is generated based at least on a selection input from the corresponding UE, and wherein the operations further comprise performing an audio clarity check to verify whether the plurality of audio input signals from the plurality of UEs meets a clarity threshold.

17. The computer-readable medium of claim 16, wherein the operations further comprise if a particular audio input signal from a particular UE does not meet the clarity threshold, isolating the particular audio input signal in real time and performing clarity enhancement for the particular audio input signal.

* * * * *